(12) United States Patent
Kokubo

(10) Patent No.: US 8,548,393 B2
(45) Date of Patent: Oct. 1, 2013

(54) ELECTRONIC APPARATUS AND STORAGE MEDIUM STORING LOAD DISTRIBUTION PROGRAM

(75) Inventor: Asao Kokubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 888 days.

(21) Appl. No.: 12/585,567

(22) Filed: Sep. 17, 2009

(65) Prior Publication Data

US 2010/0009726 A1 Jan. 14, 2010

Related U.S. Application Data

(63) Continuation of application No. PCT/JP2007/056016, filed on Mar. 23, 2007.

(51) Int. Cl.
*H04B 1/40* (2006.01)
(52) U.S. Cl.
USPC .................. 455/84; 711/E12.023; 455/574
(58) Field of Classification Search
USPC .............. 455/558, 557; 370/463; 711/122
See application file for complete search history.

(56) References Cited

U.S. PATENT DOCUMENTS

| | | | | |
|---|---|---|---|---|
| 5,790,256 | A * | 8/1998 | Brown et al. | 356/613 |
| 6,272,116 | B1 | 8/2001 | Kurihara | |
| 6,751,706 | B2 * | 6/2004 | Chauvel et al. | 711/122 |
| 7,024,225 | B2 * | 4/2006 | Ito | 455/558 |
| 7,174,194 | B2 | 2/2007 | Chauvel et al. | |
| 7,730,248 | B2 * | 6/2010 | Goss et al. | 710/261 |
| 7,941,790 | B2 * | 5/2011 | Cabillic et al. | 717/139 |
| 2002/0065049 | A1 | 5/2002 | Chauvel et al. | |
| 2002/0073282 | A1 | 6/2002 | Chauvel et al. | |
| 2004/0025068 | A1 * | 2/2004 | Gary et al. | 713/300 |
| 2004/0073882 | A1 * | 4/2004 | Osann, Jr. | 716/16 |
| 2005/0283629 | A1 | 12/2005 | Tanaka et al. | |
| 2006/0031695 | A1 * | 2/2006 | Isozaki et al. | 713/375 |
| 2008/0307240 | A1 * | 12/2008 | Dahan et al. | 713/320 |

(Continued)

FOREIGN PATENT DOCUMENTS

| | | |
|---|---|---|
| CN | 1734438 | 2/2006 |
| EP | 1 182 538 | 2/2002 |

(Continued)

OTHER PUBLICATIONS

International Search Report for PCT/JP2007/056016, mailed Jun. 19, 2007.

(Continued)

*Primary Examiner* — Lewis West
*Assistant Examiner* — Richard Chan
(74) *Attorney, Agent, or Firm* — Staas & Halsey LLP

(57) ABSTRACT

An electronic apparatus includes: a clock generation section which generates and outputs a clock of a frequency according to a state; and an MPU and a DSP which, being supplied with the clock generated by the clock generation section, execute processes at a processing speed synchronized with the clock. The electronic apparatus further includes: a load prediction section which predicts a DSP load based on a DSP application to be executed now out of DSP applications installed by being coded for processing by the DSP as well as on a frequency of a clock currently being outputted from the clock generation section; and a load allocation section which allocates part of processes of the DSP application to be executed now to the MPU, based on the load predicted by the load prediction section and thereby makes the MPU execute the part of processes.

8 Claims, 15 Drawing Sheets

(56) References Cited

U.S. PATENT DOCUMENTS

| | | | |
|---|---|---|---|
| 2009/0049220 A1* | 2/2009 | Conti et al. | 710/267 |
| 2009/0157936 A1* | 6/2009 | Goss et al. | 710/264 |
| 2010/0009726 A1* | 1/2010 | Kokubo | 455/574 |
| 2010/0122008 A1* | 5/2010 | Goss et al. | 710/264 |

FOREIGN PATENT DOCUMENTS

| | | |
|---|---|---|
| EP | 1 630 672 | 3/2006 |
| JP | 11-17572 | 1/1999 |
| JP | 2002-202893 | 7/2002 |
| JP | 2004-199139 | 7/2004 |
| JP | 2006-31525 | 2/2006 |
| JP | 2006-053654 | 2/2006 |
| WO | 2005/096143 | 10/2005 |

OTHER PUBLICATIONS

English Translation of the International Preliminary Report on Patentability mailed on Oct. 8, 2009, issued in corresponding International Patent Application PCT/JP2007/056016.

Japanese Office Action mailed Apr. 24, 2012 issued in corresponding Japanese Patent Application 2009-506087.

* cited by examiner

ELECTRONIC APPARATUS AND STORAGE MEDIUM STORING LOAD DISTRIBUTION PROGRAM

CROSS-REFERENCE TO RELATED APPLICATION

This is a continuation application of PCT/JP2007/056016, filed on Mar. 23, 2007.

FIELD

The embodiments discussed herein are related to an electronic apparatus equipped with both MPU and DSP as well as to a storage medium that stores a load distribution program, which distributes loads to the MPU and DSP when executed on the electronic apparatus equipped with both the MPU and DSP.

BACKGROUND

Recently, mobile phone terminals such as mobile telephones have spread rapidly. Furthermore, recent mobile phone terminals have not only simple phone functions, e-mail functions, and the like, but also various other additional functions such as multimedia (image display and audio playback) or game functions, becoming more complex every year and requiring further improvements in processing power. In addition to requirements for the improvements in processing power, there is demand for further downsizing as well as for power-saving standby time to extend battery life, and various measures are taken.

Generally, a mobile phone terminal such as those described above incorporates both MPU (Micro Processing Unit) and DSP (Digital Signal Processor), and it is common practice that among various processes performed on the mobile phone terminal, overall control is performed by the MPU while main processing part of CODEC and multimedia is handled by the DSP. Thus, that part of processing which is handled by the DSP is designed separately from the MPU, and a dedicated DSP program is created, being coded for the DSP.

During a standby time, generally, frequency of a clock supplied to the MPU and DSP is reduced to suppress power consumption.

Conventionally, mobile phone terminals mainly have phone functions. Thus, there is no problem if clock frequency is changed depending on whether the mobile phone terminal is standing by awaiting a call or engaged in a call. However, with recent mobile phone terminals, the DSP has come to handle a game or multimedia which alone causes a high load even if no call is taking place. In such a case, if the clock frequency of the DSP is kept reduced, there will be a shortage of processing power. To resolve this problem, it is conceivable for example, to add dedicated hardware or increase the clock frequency in high-load situations even if no call is taking place. However, addition of dedicated hardware will cause a cost increase and run counter to a downsizing trend. If the processing power of the DSP is increased by increasing the clock frequency, power consumption will be increased accordingly, posing a new problem: namely, the battery is drained heavily, making it impossible to stand long use without recharging.

SUMMARY

According to an aspect of the invention, an electronic apparatus includes:
a clock generation section which generates and outputs a clock of a frequency according to a state;
an MPU and a DSP which, being supplied with the clock generated by the clock generation section, execute processes at a processing speed synchronized with the clock;
a load prediction section which predicts a DSP load based on a DSP application to be executed now out of DSP applications installed by being coded for processing by the DSP as well as on a frequency of a clock currently being outputted from the clock generation section; and
a load allocation section which allocates part of processes of the DSP application to be executed now to the MPU, based on the load predicted by the load prediction section and thereby makes the MPU execute the part of processes.

According to another aspect of the invention, a storage medium stores a load distribution program which causes, when executed on an electronic apparatus, the electronic apparatus to operate as an electronic apparatus including:
a clock generation section which generates and outputs a clock of a frequency according to a state;
an MPU and a DSP which, being supplied with the clock generated by the clock generation section, execute processes at a processing speed synchronized with the clock;
a load prediction section which predicts a DSP load based on a DSP application to be executed now out of DSP applications installed by being coded for processing by the DSP as well as on a frequency of a clock currently being outputted from the clock generation section; and
a load allocation section which allocates part of processes of the DSP application to be executed now to the MPU, based on the load predicted by the load prediction section and thereby makes the MPU execute the part of processes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described below.

Figure 1:
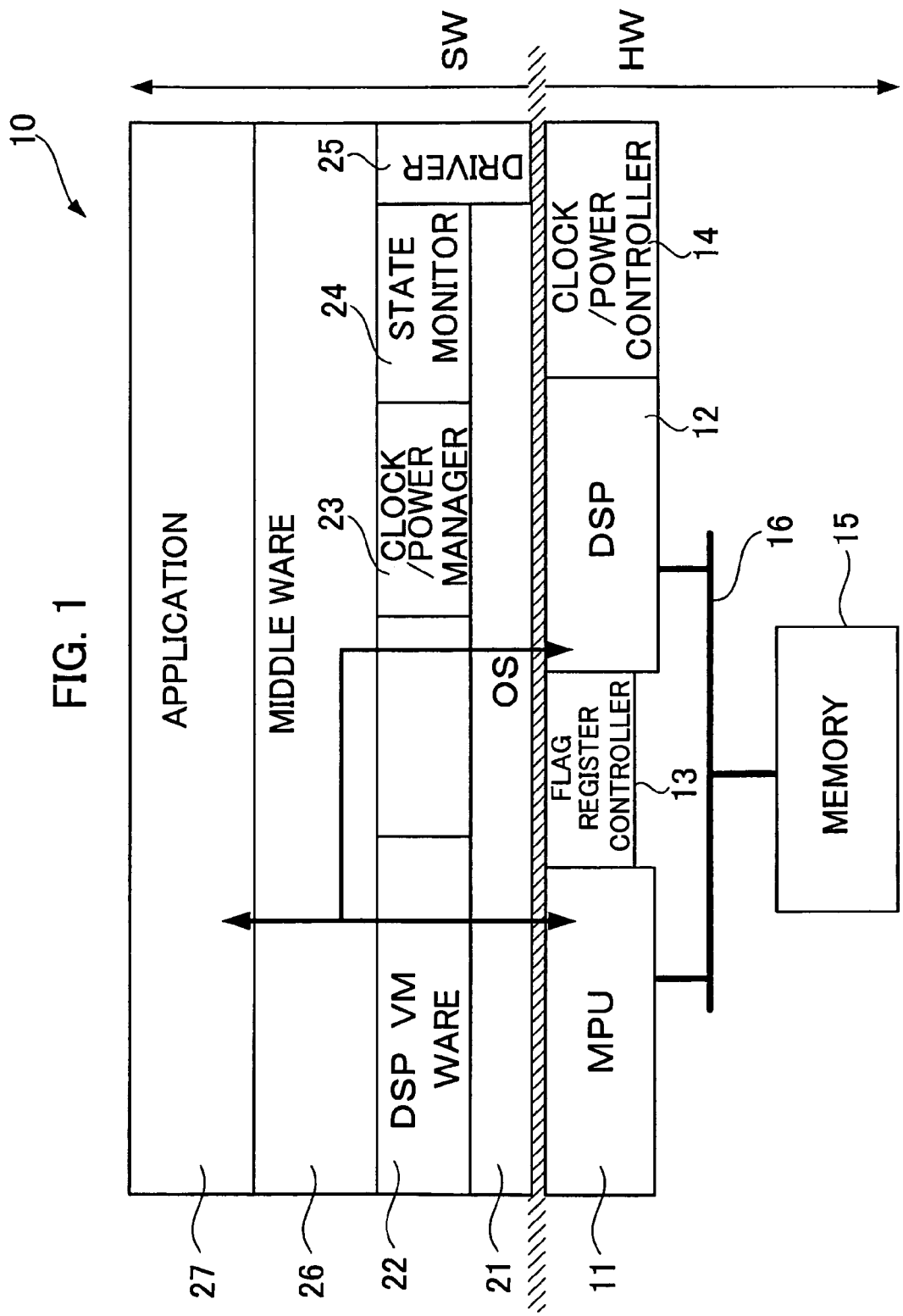
FIG. 1 is a hardware (HW)/software (SW) block diagram of a mobile phone terminal which is an example of an electronic apparatus according to an embodiment of the present invention.

FIG. 1 is a hardware (HW)/software (SW) block diagram of a mobile phone terminal which is an example of an electronic apparatus according to an embodiment of the present invention.

A mobile phone terminal may carry various hardware and software according to the type and specifications of the mobile phone terminal. However, description and illustration of the various hardware and software are omitted herein, and only the hardware and software needed to describe features of the embodiment of the present invention are illustrated and will be described hereinafter.

In terms of hardware, a mobile phone terminal 10 illustrated in FIG. 1 includes an MPU 11 and a DSP 12 as components which have computational functions. Besides, FIG. 1 illustrates a flag register controller 13, clock/power controller 14, memory 15, and bus 16 as other hardware components.

The flag register controller 13 is a component which manages flags needed for load distribution between the MPU 11 and the DSP 12. The clock/power controller 14 is a component which controls clock generation, frequency switching, and power on/off operations. The memory 15 is a component into which programs are copied for execution on the MPU 11 and the DSP 12. Incidentally, a storage device used to store the programs is not illustrated herein. Alternatively, it may be considered that entire software (SW) described below corresponds to the inside of a storage device.

Also, in terms of software, the mobile phone terminal 10 illustrated in FIG. 1 includes an OS (operating system) 21, DSP virtual machine ware 22, a clock power manager 23, a state monitor 24, a driver 25, middle ware 26, and applications 27. The applications 27 include DSP programs.

The DSP virtual machine ware 22 is an emulator which, being executed by the MPU 11, causes the MPU 11 to operate in a manner similar to the DSP 12. The present embodiment, which incorporates the DSP virtual machine ware 22, allows DSP programs originally coded for processing by the DSP 12 to be executed as they are by the MPU 11 under the DSP virtual machine ware 22. Thus, the present embodiment does not need to provide new MPU programs in order to make the MPU 11 execute the DSP programs in a manner equivalent to when the DSP programs are executed by the DSP 12.

The clock power manager 23 plays a role in controlling the clock frequency switching and power on/off operations performed by the clock/power controller 14 in terms of hardware.

The state monitor 24 manages current state of the mobile phone terminal 10.

The driver 25 plays a role of giving instructions to the clock/power controller 14 on instructions from the clock power manager 23.

Above the various programs is the middle ware 26. Furthermore, above the middle ware 26 are the applications 27 of various types.

Of the applications 27, as indicated by arrows in FIG. 1, DSP applications are executed by the DSP 12 as they are, and executed by the MPU 11 under the DSP virtual machine ware 22 as described above.

Now, processes performed by the DSP 12 will be outlined.

Figure 2:
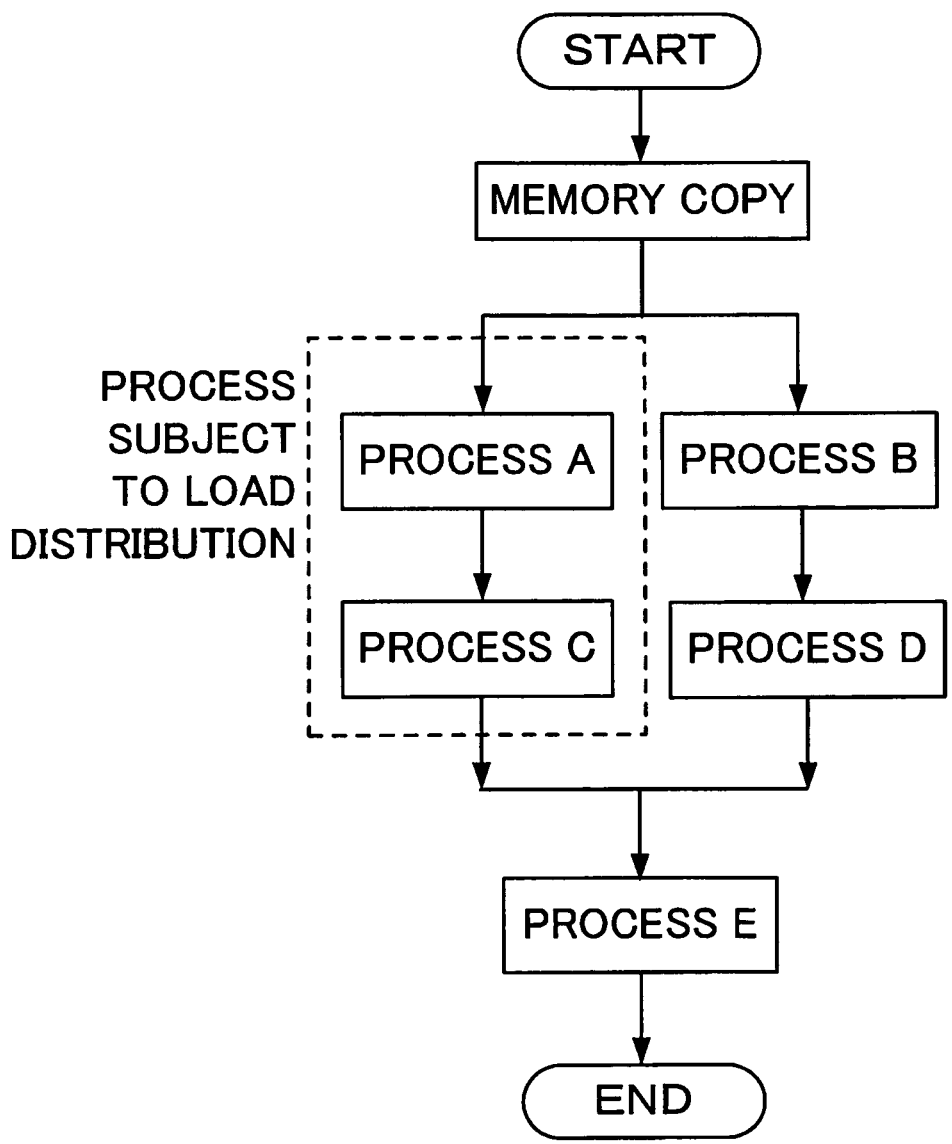
FIG. 2 is a diagram illustrating processes to be performed by a DSP.

FIG. 2 is a diagram illustrating processes to be performed by the DSP.

First, five processes A to E to be performed by the DSP are copied into the memory 15 in FIG. 1 for execution. Subsequently, processes A to E are executed by the DSP 12, where processes A and C need to be performed sequentially in this order and similarly processes B and D need to be performed sequentially in this order. However, processes B and D can be executed independently of processes A and C. Process E is executed based on results of processes A to D after processes A to D are all finished.

Incidentally, the five processes A to E are illustrated in FIG. 2 according to their execution sequence, and processes A to E are separate programs each of which are started and executed independently.

Of the five processes, processes A and C are subject to load distribution, according to the present embodiment.

Figure 3:
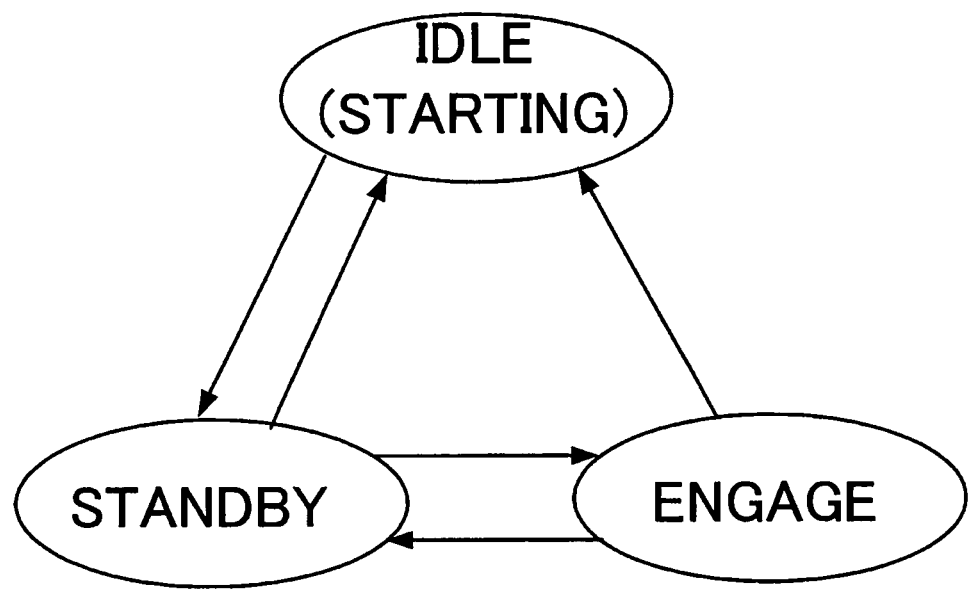
FIG. 3 is a diagram illustrating state transitions of the mobile phone terminal in FIG. 1.

FIG. 3 is a diagram illustrating state transitions of the mobile phone terminal in FIG. 1.

The mobile phone terminal 10 has three states: idle (starting), standby, and engaged. The idle (starting) state occurs during start-up after power is turned on (including a shutdown phase after power is turned off). The standby state exists when power is on, but no call is taking place. The engaged state exists when the mobile phone terminal 10 is engaged in a call. Information as to which of the three states the mobile phone terminal 10 is currently in is managed by the state monitor 24 in FIG. 1.

Table 1 is a correspondence table between the three states illustrated in FIG. 3 and a state coefficient used to predict loads. Table 1 is stored in the state monitor 24.

TABLE 1

| State name | State coefficient |
| --- | --- |
| Idle (starting) | 0 |
| Standby | 2 |
| Engaged | 1 |

In the idle (starting) state, since the DSP practically does not perform any processing and the load is zero, the state coefficient is set at "0." In the standby state, the clock frequency is divided into half the frequency for the engaged state that will be described later. Consequently, the load used to execute the same process is doubled over the engaged state. Thus, the state coefficient is set at "2." In the engaged state, since the clock frequency is twice the frequency for the standby state, the load used to execute the same process is half the engaged state. Thus, the state coefficient is set at "1."

Table 2 is a correspondence table between the processes illustrated in FIG. 2 and a process coefficient used to predict loads. Table 2 is stored in the state monitor 24 as in the case of Table 1.

TABLE 2

| Process name | Process coefficient |
| --- | --- |
| Process A | 3 |
| Process B | 2 |

TABLE 2-continued

| Process name | Process coefficient |
|---|---|
| Process C | 4 |
| Process D | 1 |
| Process E | 2 |

Figure 4:
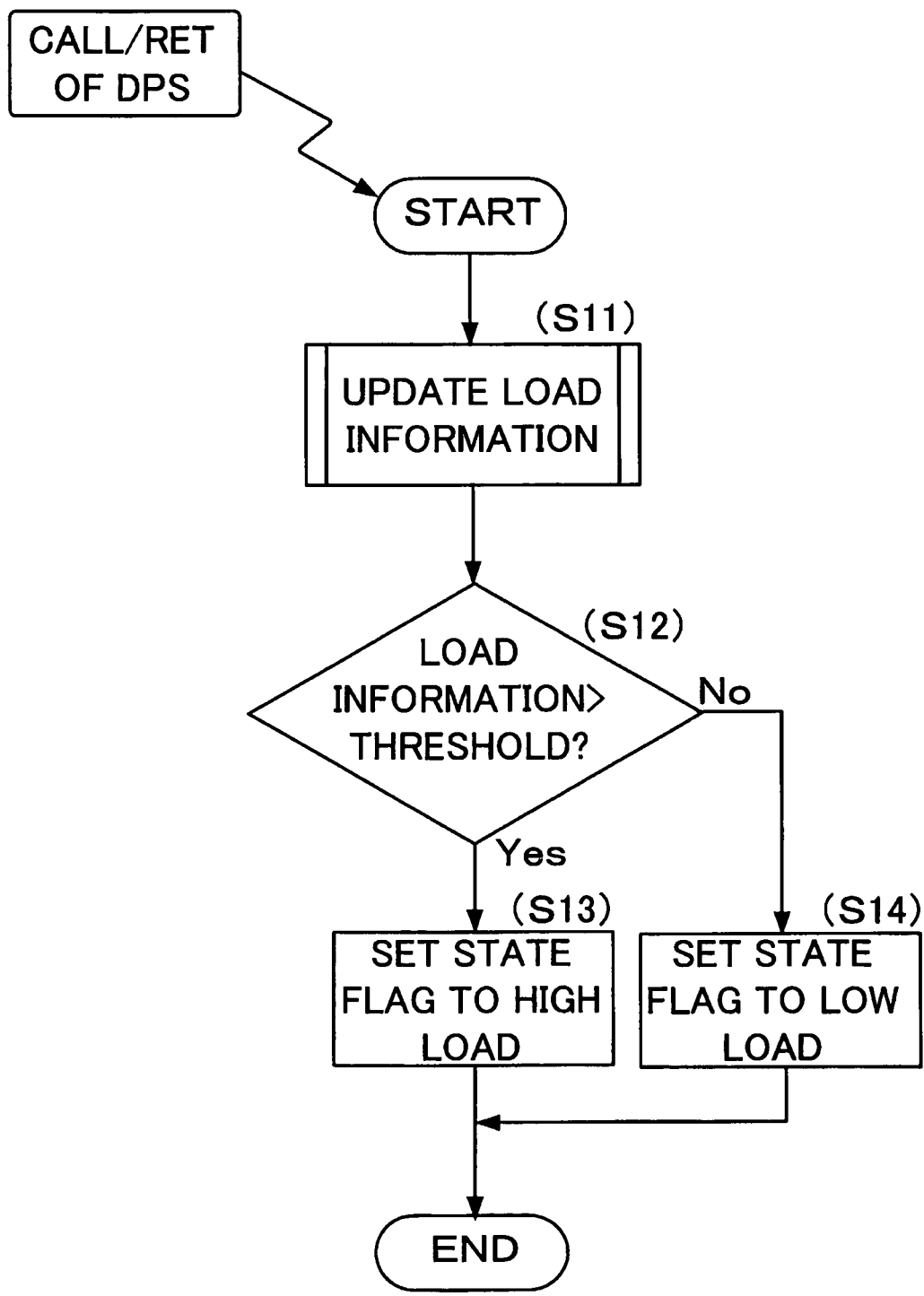
FIG. 4 is a flowchart of load determination procedures carried out by a state monitor.

FIG. 4 is a flowchart of load determination procedures carried out by the state monitor 24.

The load determination procedures illustrated in FIG. 4 are carried out at the time when the process (any of processes A to E in FIG. 2, in this example) to be executed by the DSP is started (call) and at the time when an executing process is finished (ret).

When the load determination procedures in FIG. 4 are started, first the state monitor 24 updates load information in step S11. The load information is updated based on the following expressions.

At the start: load information (after update)=load information (before update)+process coefficient×state coefficient At the finish: load information (after update)=load information (before update)—process coefficient×state coefficient For example, in initial state in which the mobile phone terminal 10 is in standby state and any of processes A to E in FIG. 2 is executed, the load information (before update) is "0." If process A is started in this state, Load information (process A started)=0+3×2=5 where "3" is the value of the process coefficient associated with process A in Table 2 and "2" is the value of state coefficient associated with the standby state in FIG. 1.

Suppose, process B is started during execution of process A. Then, the load information changes as follows.

Load information (process A being executed; process B started)=5+2×2=9

Furthermore, when the execution of process A is finished, the load information changes as follows.

Load information (process B being executed; process A finished)=9−3×2=5

In step S11 of the load determination procedures in the flowchart in FIG. 4, the load information is updated through computational operations described below.

Next, in step S12 in FIG. 4, the updated load information is compared with a predetermined threshold. If the load information is larger, a state flag is set to high load (step S13). If the load information does not exceed the threshold, the state flag is set to low load (step S14).

Figure 5:
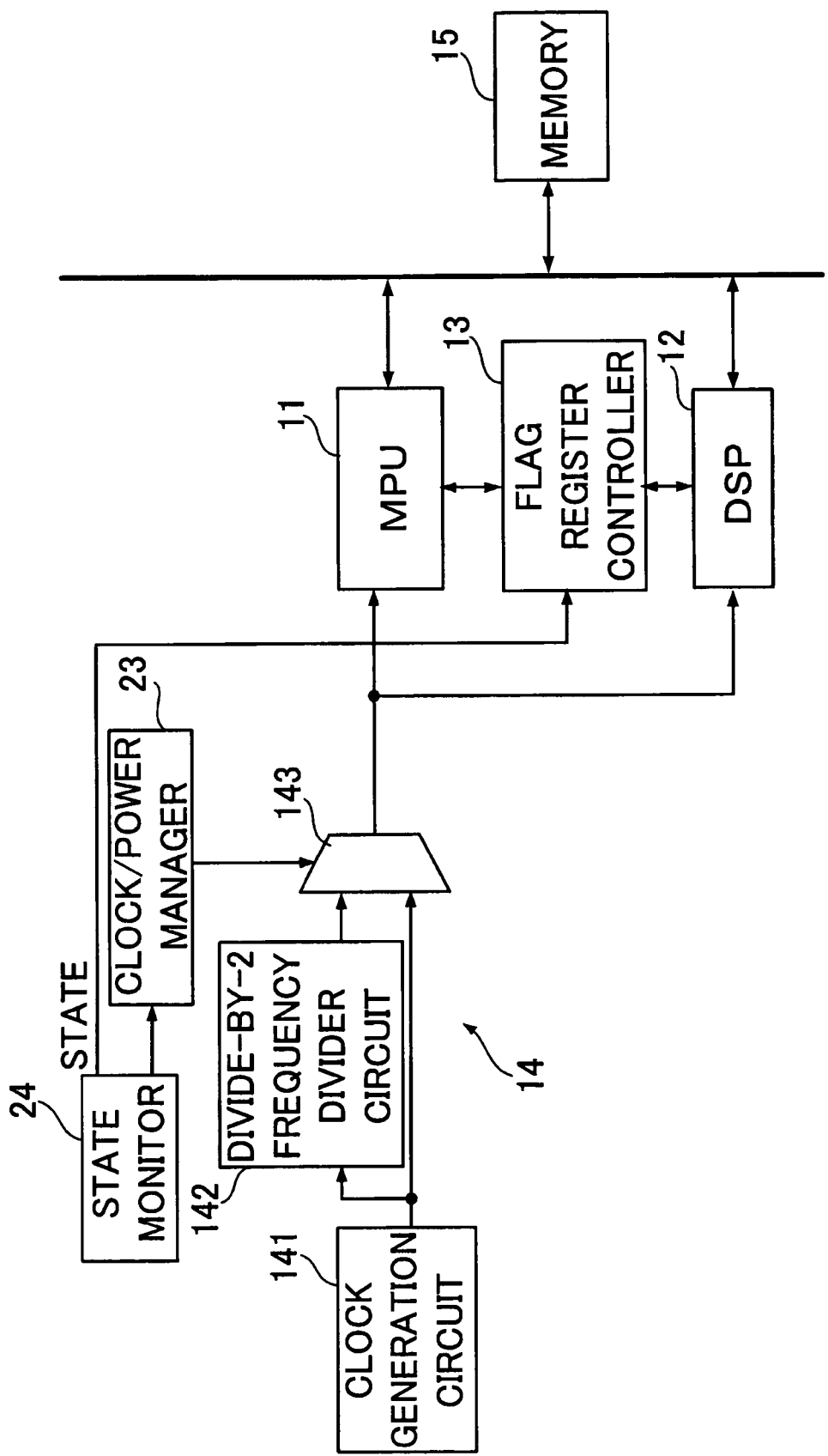
FIG. 5 is a circuit diagram illustrating a portion involved in clock frequency division and load distribution.

FIG. 5 is a circuit diagram illustrating a portion involved in clock frequency division and load distribution.

A clock generation circuit 141 of a clock/power controller 14 generates a clock of a frequency appropriate to engaged state. The generated clock is inputted directly in a multiplexer 143 as well as in a divide-by-2 frequency divider circuit 142. The divide-by-2 frequency divider circuit 142 divides the frequency of the inputted clock into halves to generate a clock of a frequency for the engaged state. The clock divided by the divide-by-2 frequency divider circuit 142 is also inputted in the multiplexer 143.

On the other hand, the clock power manager 23 acquires information which represents the current state out of the three states (practically, the standby state and engaged state) from the state monitor 24. Based on the acquired information, the clock power manager 23 makes the multiplexer 143 output a clock via the driver 25 illustrated in FIG. 2 (omitted in FIG. 5): in standby state, the multiplexer 143 outputs the clock produced by the divide-by-2 frequency divider circuit 142 while in engaged state, the multiplexer 143 outputs the clock received directly from the clock generation circuit 141. Also, the state monitor 24 passes information as to whether the state flag is set to high load or low load to the flag register controller 13, where the state flag is obtained through the control procedures described with reference to FIG. 4. The flag register controller 13 distributes loads according to the state indicated by the state flag so that under low loads, processes A to E in FIG. 2 will all be executed by the DSP 12 and that under high loads, processes A and C will be executed by the MPU 11 while processes B, D, and E will be executed by the DSP 12.

Figure 6:
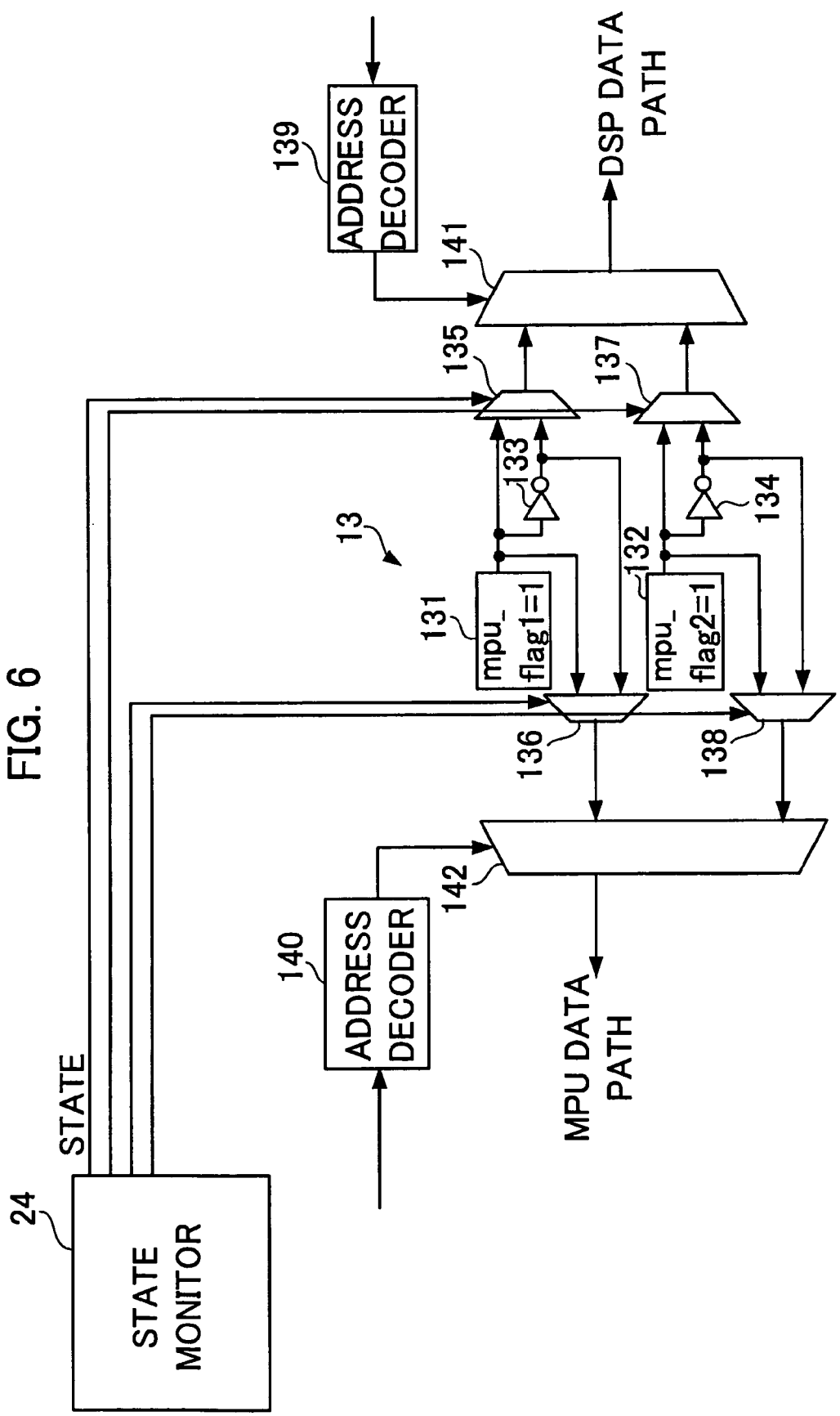
FIG. 6 is an internal block diagram of a flag register controller.

FIG. 6 is an internal block diagram of the flag register controller.

The flag register controller 13 includes two registers 131 and 132 whose flags are constantly set to '1.' Output '1' from the flag register 131 is inputted directly in two multiplexers 135 and 136. Also, an inverted value '0' generated by an inverter 133 is inputted in the two multiplexers 135 and 136. Similarly, output '1' from the flag register 132 is inputted directly in two multiplexers 137 and 138 and an inverted value '0' generated by an inverter 134 is inputted in the two multiplexers 137 and 138. Each of the four multiplexers 135, 136, 137, and 138 outputs one of the two inputs by switching between the two according to the state indicated by the state flag (high load or low load) determined by the state monitor 24.

Table 3 lists values outputted to the MPU and DSP according to the state of the state flag.

TABLE 3

| | Built-in register's name | Value outputted to MPU | Value outputted to DSP |
|---|---|---|---|
| Under high loads | mpu_flag1 | 0 | 1 |
| | mpu_flag2 | 1 | 0 |
| Under low loads | mpu_flag1 | 1 | 0 |
| | mpu_flag2 | 1 | 0 |

When the state flag indicates high load, '0' and '1' are outputted to the MPU via the multiplexers 136 and 138, respectively, and '1' and '0' are outputted to the DSP via the multiplexers 135 and 137, respectively. On the other hand, when the state flag indicates low load, '1' and '1' are outputted to the MPU via the multiplexers 136 and 138, respectively, and '0' and '0' are outputted to the DSP via the multiplexers 135 and 137, respectively. Outputs from the two multiplexers 135 and 137 on the DSP side are inputted in another multiplexer 141 while outputs from the two multiplexers 136 and 138 on the MPU side are inputted in another multiplexer 142.

The multiplexer 141 on the DSP side and multiplexer 142 on the MPU side are controlled, respectively, by an address decoder 139 on the DSP side and an address decoder 140 on the MPU side such that outputs from the multiplexers 135 and 136 will be outputted when the process to be executed belongs to process A or C and outputs from the multiplexers 137 and 138 will be outputted when the process to be executed belongs to process B, D, or E.

Outputs from the multiplexer 141 on the DSP side and multiplexer 142 on the MPU side are sent to a DSP data path and MPU data path, respectively, to control a flow of data (a program) to be read out of the memory 15.

Figure 7:
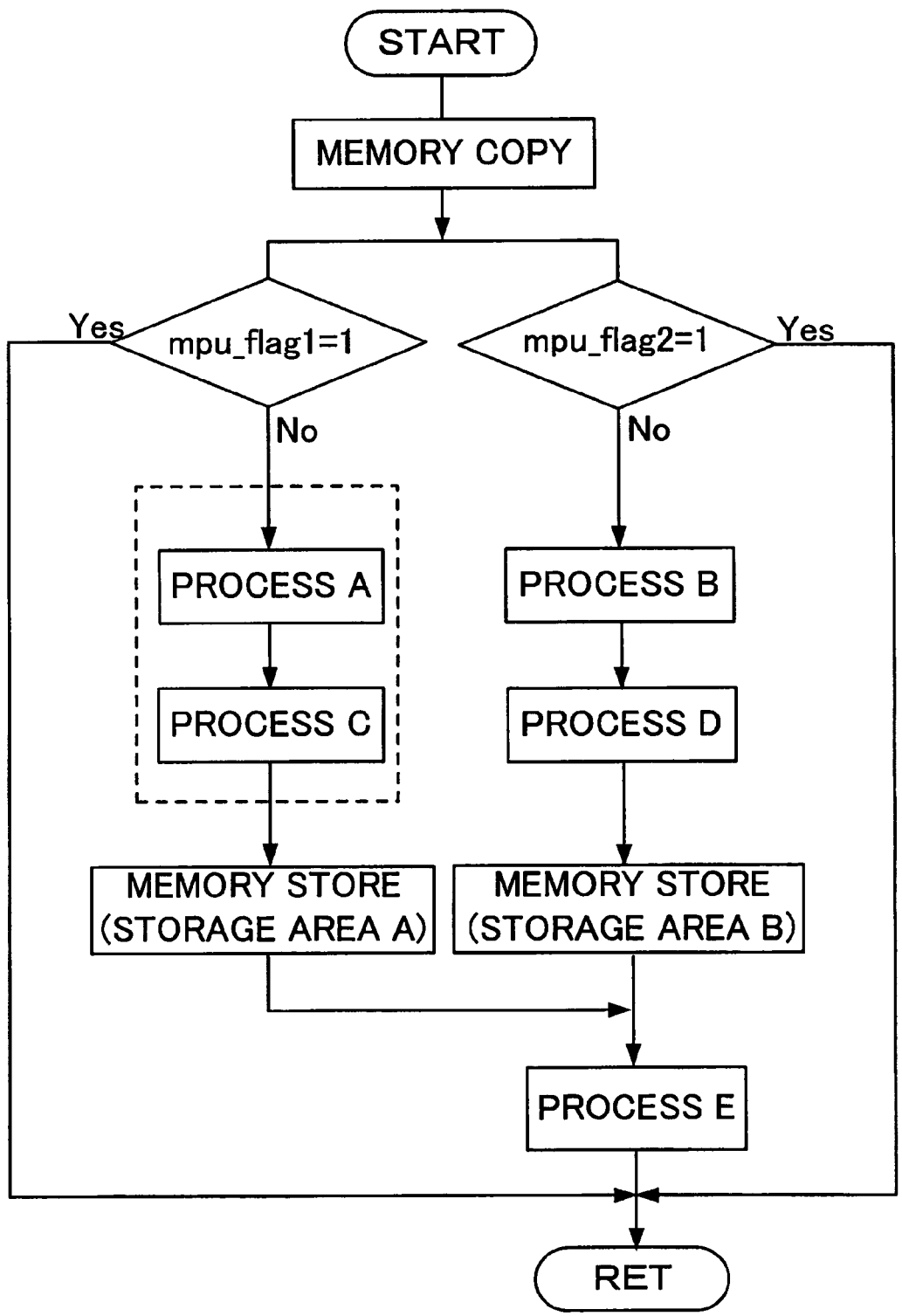
FIG. 7 is flowchart conceptually illustrating a flow of processes for the DSP.

FIG. 7 is flowchart conceptually illustrating a flow of processes for the DSP. FIG. 7 illustrates processes in the MPU and DSP.

As in the case of FIG. 2, a DSP program is copied into the memory 15 for execution. Then, the two flags are checked.

First, description will be focused on the MPU.

As seen from Table 3 above, under high loads, the two flags mpu_flag1 and mpu_flag2 on the MPU side are set to '0' and '1,' respectively. When the values are put into the flowchart in FIG. 7, since mpu_flag1 is '0,' the MPU executes processes A and C and stores results of the processes in storage area A of the memory 15. Since the other flag mpu_flag2 for the MPU under high loads is '1,' the MPU does not execute processes B, D, and E.

Under low loads, since the two flags mpu_flag1 and mpu_flag2 are both set to '1' on the MPU side, the MPU does not execute any of the processes as illustrated in FIG. 7.

Next, description will be focused on the DSP.

On the DSP side, under high loads, since the two flags mpu_flag1 and mpu_flag2 are set to '1' and '0,' respectively, the DSP does not execute processes A and C, but executes processes B and D and stores results of the processes in storage area B of the memory 15, as illustrated in FIG. 7. Furthermore, the DSP executes process E using the results of processes B and D as well as the results of processes A and C executed by the MPU, where the results of processes B and D are stored in storage area B of the memory 15 while the results of processes A and C are stored in storage area A of the memory 15.

Under low loads, since the two flags mpu_flag1 and mpu_flag2 are both set to '0' on the DSP side, the DSP executes all the processes A to E.

In this way, according to the present embodiment, load distribution is performed based on the loads predicted at the given time point, with processes A and C being executed by the DSP under low loads, and by the MPU under high loads.

Next, a second embodiment of the present invention will be described below. Basic hardware and software components at the level illustrated in FIG. 1 are the same as the embodiment described above, and thus redundant description thereof will be omitted. The present embodiment will be described based on the above embodiment, but following a course different from the above embodiment, for ease of understanding.

Figure 8:
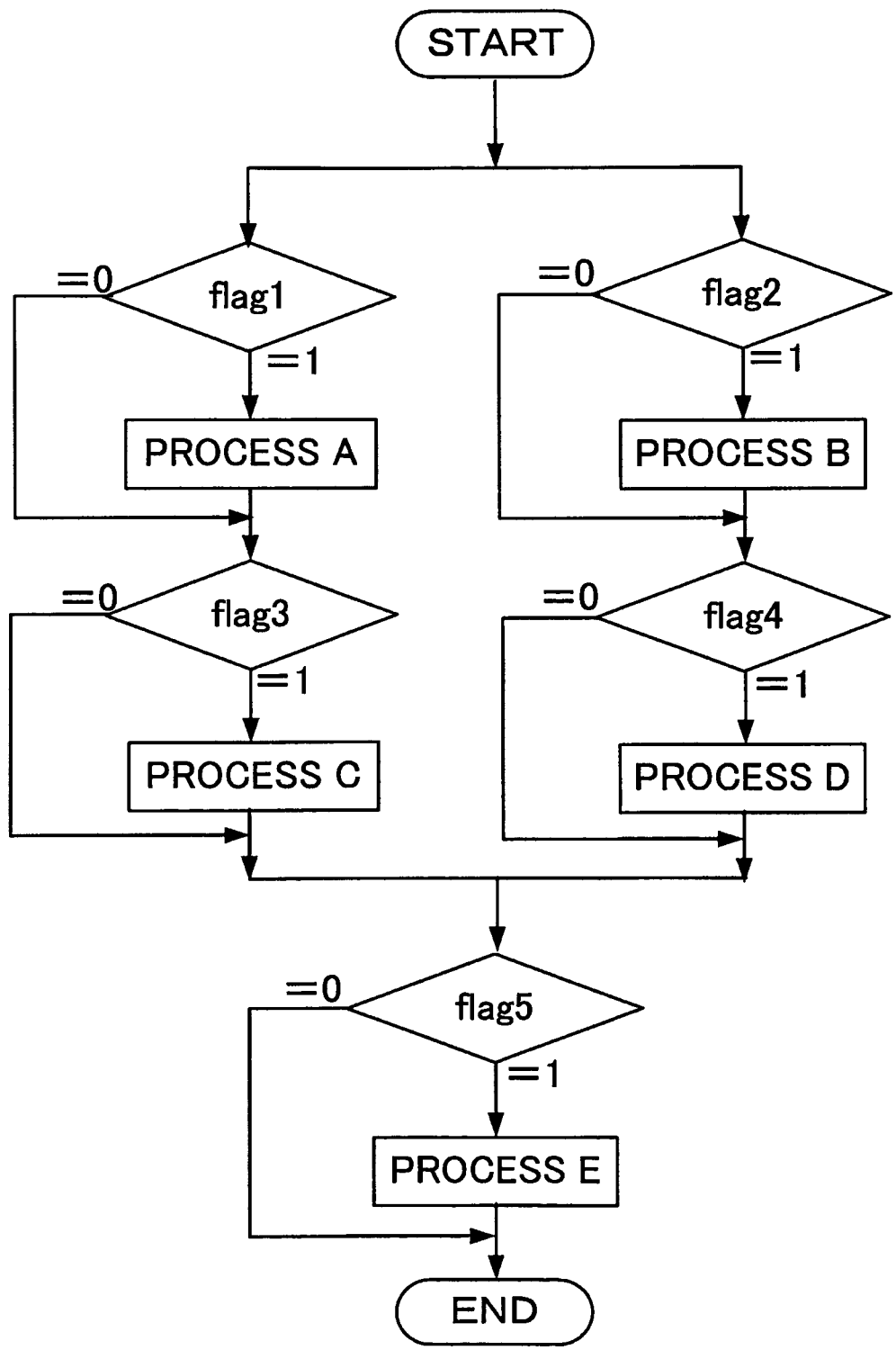
FIG. 8 is a diagram illustrating processes in a MPU and the DSP.

FIG. 8 is a diagram illustrating processes in the MPU and DSP. FIG. 8 corresponds to FIG. 7 of the previously described embodiment.

Processes A and C are performed sequentially in this order and processes B and D are performed sequentially in this order as with the previously described embodiment, but processes A and C may be executed in parallel with, and independently of, processes B and D. On the other hand, process E is executed after execution of processes A to D, with reference to the results of processes A to D.

According to the present embodiment, five flags each—namely, flag1, flag2, flag3, flag4, flag5—are outputted to the MPU side and DSP side. Each of the processes is either executed or not executed depending on the value of ('1' or '0') the corresponding flag: when the value of a flag is '1,' the corresponding process is executed and when the value of a flag is '0,' the corresponding process is not executed.

Figure 9:
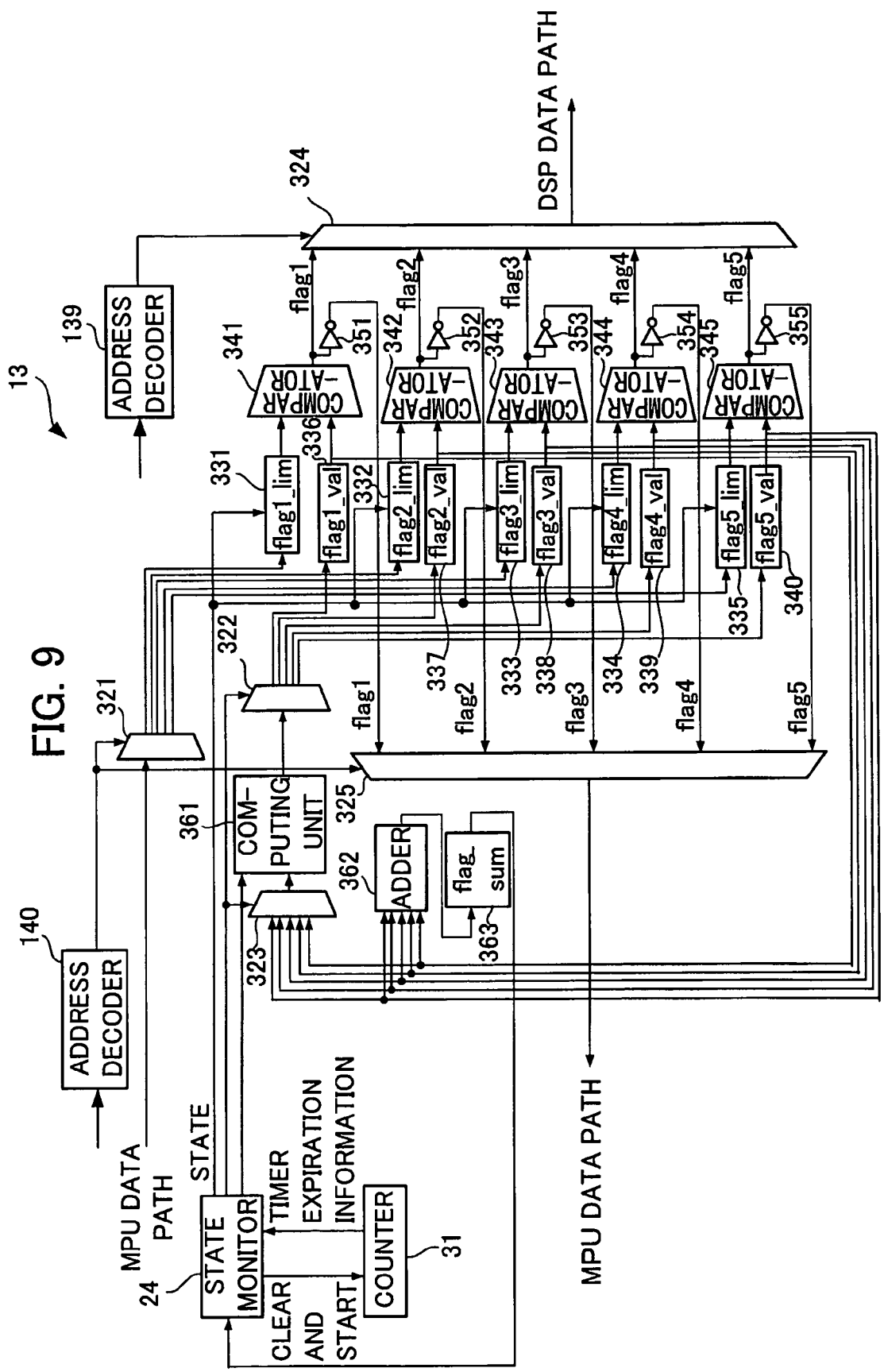
FIG. 9 is an internal block diagram of a flag register controller according to a second embodiment.

FIG. 9 is an internal block diagram of a flag register controller according to the second embodiment. FIG. 9 corresponds to FIG. 6 of the previously described embodiment.

The state monitor 24 manages states described below, using a counter 31.

Figure 10:
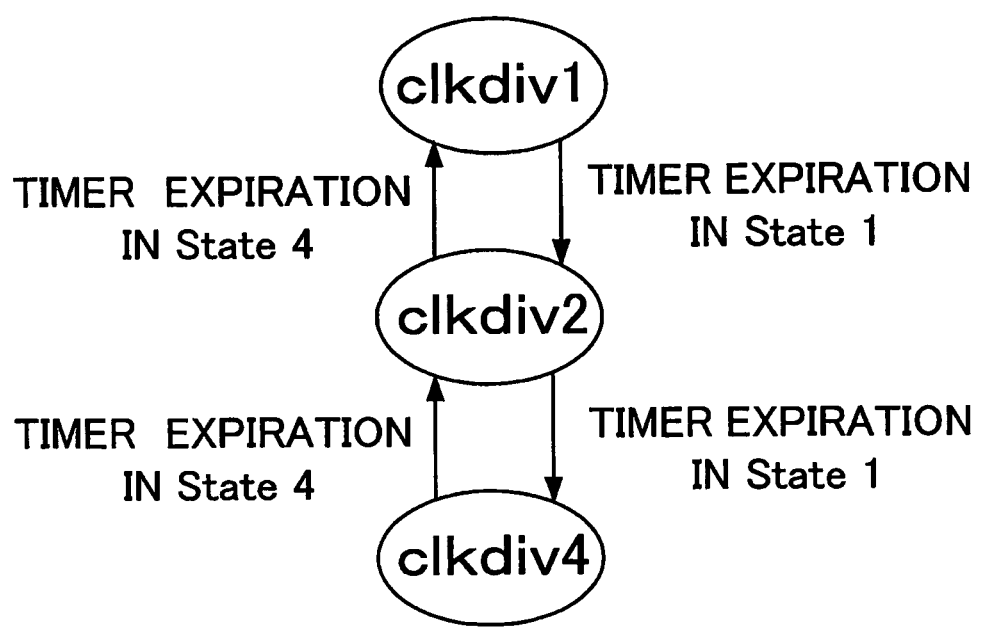
FIG. 10 is a state transition diagram illustrating transitions among main states managed by the state monitor.

FIG. 10 is a state transition diagram illustrating transitions among main states managed by the state monitor 24.

In the second embodiment described here, two levels of states are managed: main states in which clock frequency is changed and substates in which the clock frequency remains constant. Of the main states and substates, FIG. 10 shows state transitions among the main states.

Table 4 below is a correspondence table between main states and frequency division ratios.

TABLE 4

| State | Frequency division ratio |
|---|---|
| clkdiv1 | 1 |
| clkdiv2 | 2 |
| clkdiv4 | 4 |

As illustrated in FIG. 10 and Table 4, there are three main states: clkdiv1, clkdiv2, and clkdiv4. Of the three states, clkdiv1, which corresponds to a frequency division ratio of 1, operates on a clock of the highest frequency. Also, clkdiv2, which corresponds to a frequency division ratio of 2, operates on a clock of a frequency half the frequency of clkdiv1. Furthermore, clkdiv4, which corresponds to a frequency division ratio of 4, operates on a clock of a frequency half the frequency of clkdiv2 (¼ of clkdiv1).

A transition from clkdiv1 to clkdiv2 takes place when state1 illustrated in FIG. 11 (described later) continues for a predetermined time in clkdiv1. A transition from clkdiv2 to clkdiv4 takes place when state1 illustrated in FIG. 11 continues for a predetermined time in clkdiv2. A transition from clkdiv4 to clkdiv2 takes place when state4 illustrated in FIG. 11 continues for a predetermined time in clkdiv4. A transition from clkdiv2 to clkdiv1 takes place when state4 illustrated in FIG. 11 continues for a predetermined time in clkdiv2. The predetermined times are measured by the counter 31 illustrated in FIG. 9.

Incidentally, in the second embodiment, a figure which corresponds to FIG. 5 related to the previously described embodiment is omitted. This is because it is self-evident from FIG. 5 that a divide-by-4 frequency divider circuit may be placed in parallel to the divide-by-2 frequency divider circuit 142 in FIG. 5 and that the multiplexer 143 may output a lock by switching among a clock received directly from the clock generation circuit 141, a half-frequency clock produced by the divide-by-2 frequency divider circuit 142, and a quarter-frequency clock produced by the divide-by-4 frequency divider circuit (not shown).

Figure 11:
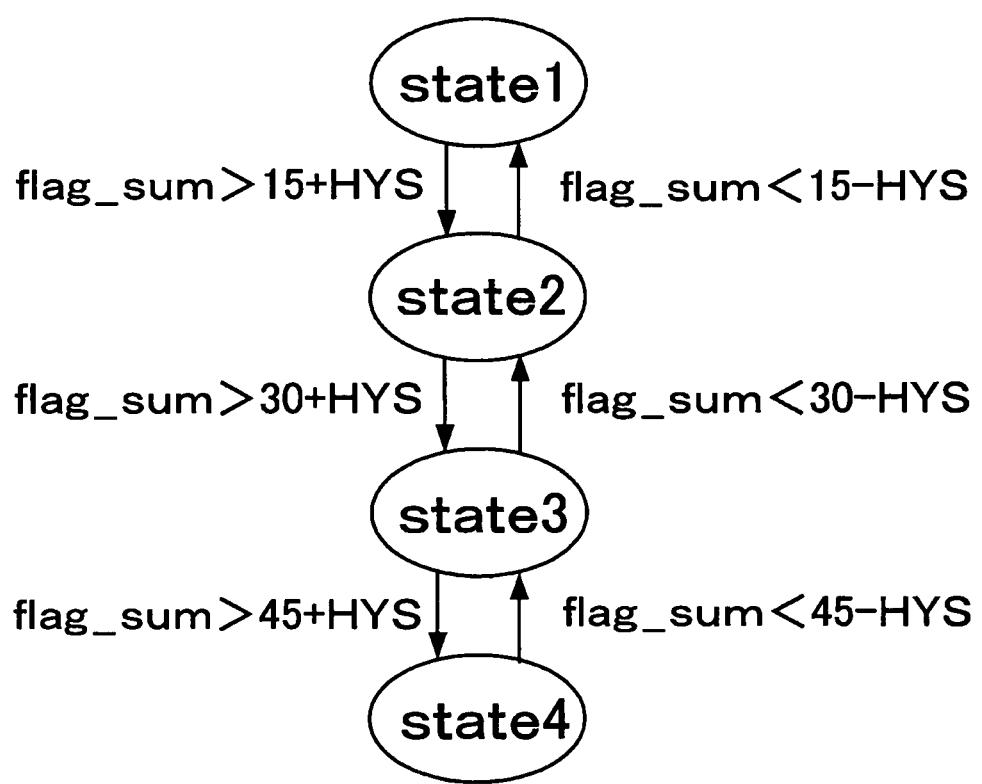
FIG. 11 is a state transition diagram illustrating transitions among substates managed by the state monitor.

FIG. 11 is a state transition diagram illustrating transitions among substates managed by the state monitor 24.

Here, the value of flag_sum (described later) is referenced. To stabilize state transitions, hysteresis is provided for the state transitions using a value HYS.

In this case, there are four substates, state1, state2, state3, and state4. Of the four substates, state1 corresponds to the lowest load, state2 and state3 correspond to the second and third lowest load, and state4 corresponds to the highest load.

A transition from state1 to state2 takes place when flag_sum exceeds 15+HYS, a transition from state2 to state3 takes place when flag_sum exceeds 30+HYS, and a transition from state3 to state4 takes place when flag_sum exceeds 45+HYS. After remaining in state4 for a predetermined time, the mobile phone terminal 10 advances by one main state (see FIG. 10) and enters the substate state1.

On the other hand, a transition from state4 to state3 takes place when flag_sum falls below 45—HYS, a transition from state3 to state2 takes place when flag_sum falls below 30

—HYS, and a transition from state2 to state1 takes place when flag_sum falls below 15—HYS. After remaining in state1 for a predetermined time, the mobile phone terminal 10 goes back by one main state in FIG. 10 and enters the substate state4.

As illustrated in FIG. 9, flag_sum is a value obtained by adding flag1_val, flag2_val, flag3_val, flag4_val, and flag5_val stored, respectively, in five registers 336, 337, 338, 339, and 340, using an adder 362 in which the values are inputted. Then, flag_sum is stored in a register 363 and transmitted to the state monitor 24.

Table 5 is a correspondence table between four applications and coefficients which represent loads of processes in the applications. The correspondence table is stored in the state monitor 24 illustrated in FIG. 9, passed from the state monitor 24 to a computing unit 361, and used to compute loads.

TABLE 5

|  | flag1_inc | flag2_inc | flag3_inc | flag4_inc | flag5_inc |
|---|---|---|---|---|---|
| application 1 | 1 | 2 | 2 | 4 | 5 |
| application 2 | 1 | 0 | 0 | 0 | 0 |
| application 3 | 1 | 2 | 0 | 0 | 0 |
| application 4 | 1 | 2 | 4 | 4 | 5 |

Each of the four applications 1 to 4 includes up to five processes A to E illustrated in FIG. 8. However, processes differ in content among the four applications even though designated by the same name such as process A. Also, each of the four applications does not necessarily include all the processes A to E, and some of the processes may be missing depending on the application. Besides, flag1_inc, flag2_inc, flag3_inc, flag4_inc, and flag5_inc are coefficients which represent the loads of each process A to E which makes up the respective processes in the applications 1 to 4. For example, the load coefficients for processes A to E in application 1 are 1, 2, 3, 4, and 5, respectively, while the load coefficients for processes A to E in application 2 are 1, 0, 0, 0, and 0, respectively. The coefficient of 0 means that the application does not have the given process. Thus, application 2 includes only process A. The above explanation is also applied to applications 3 and 4.

Based on Tables 5 and 4, the computing unit 361 illustrated in FIG. 9 calculates load information about each of processes A to E—i.e., flag1_val, flag2_val, flag3_val, flag4_val, and flag5_val—when applications 1 to 4 are viewed in a cross-sectional manner in the current state (main state+substate) and stores the calculated load information in the registers 336, 337, 338, 339, and 340.

Values of flag1_val, flag2_val, flag3_val, flag4_val, and flag5_val are calculated as follows.

Figure 12:
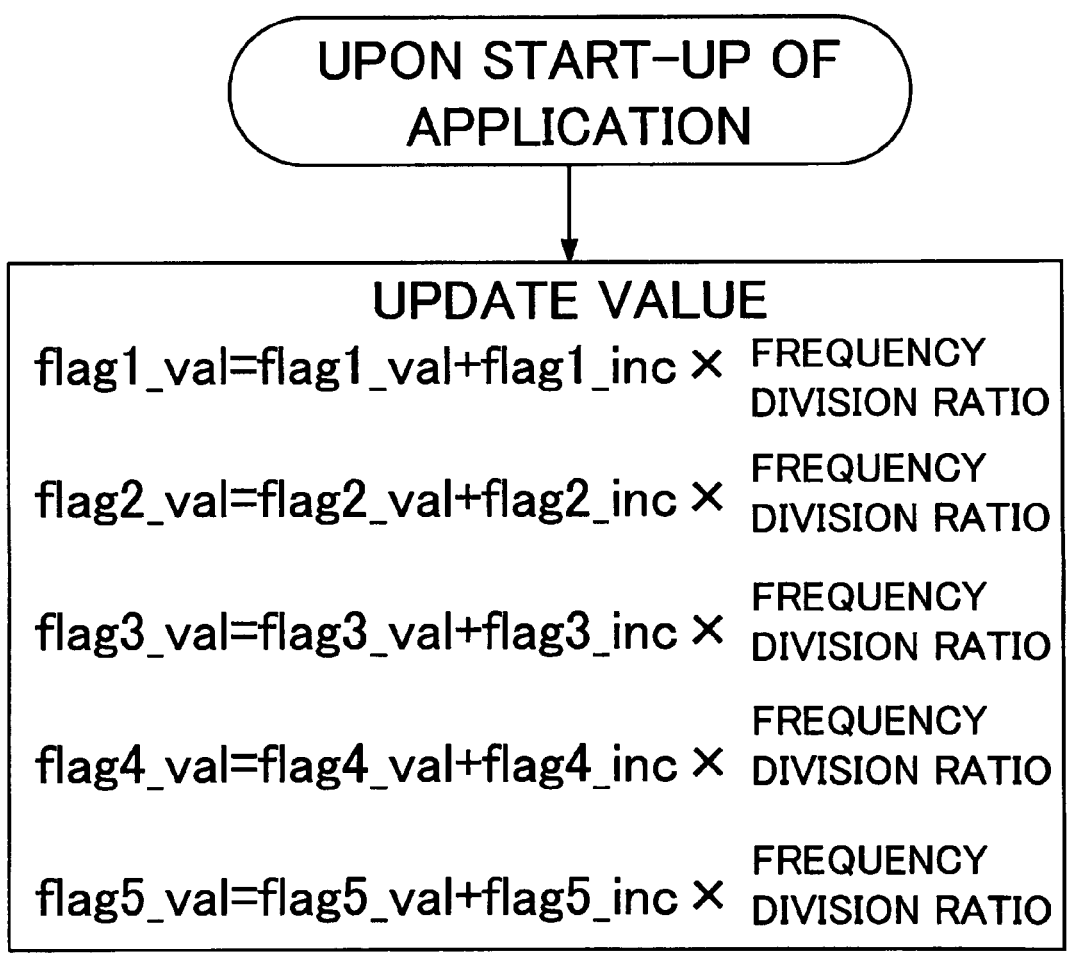
FIG. 12 is a diagram illustrating a computational process performed by a computing unit upon start-up of an application.

FIG. 12 is a diagram illustrating a computational process performed by the computing unit 361 upon start-up of an application.

Initial values of flag1_val, flag2_val, flag3_val, flag4_val, and flag5_val are all '0.' Here, flag1_val will be described representatively.

When an application is started, the value of flag1_inc in Table 5 is added to the previous flag1_val depending on the type of the application started this time (one of applications 1 to 4). However, since the load varies with the current clock frequency, the value of flag1_inc in Table 5 is added after being multiplied by the appropriate frequency division ratio (see Table 4) depending on which of clkdiv1, clkdiv2, and clkdiv4 the current main state is. The same applies to flag2_val, flag3_val, flag4_val, and flag5_val.

Figure 13:
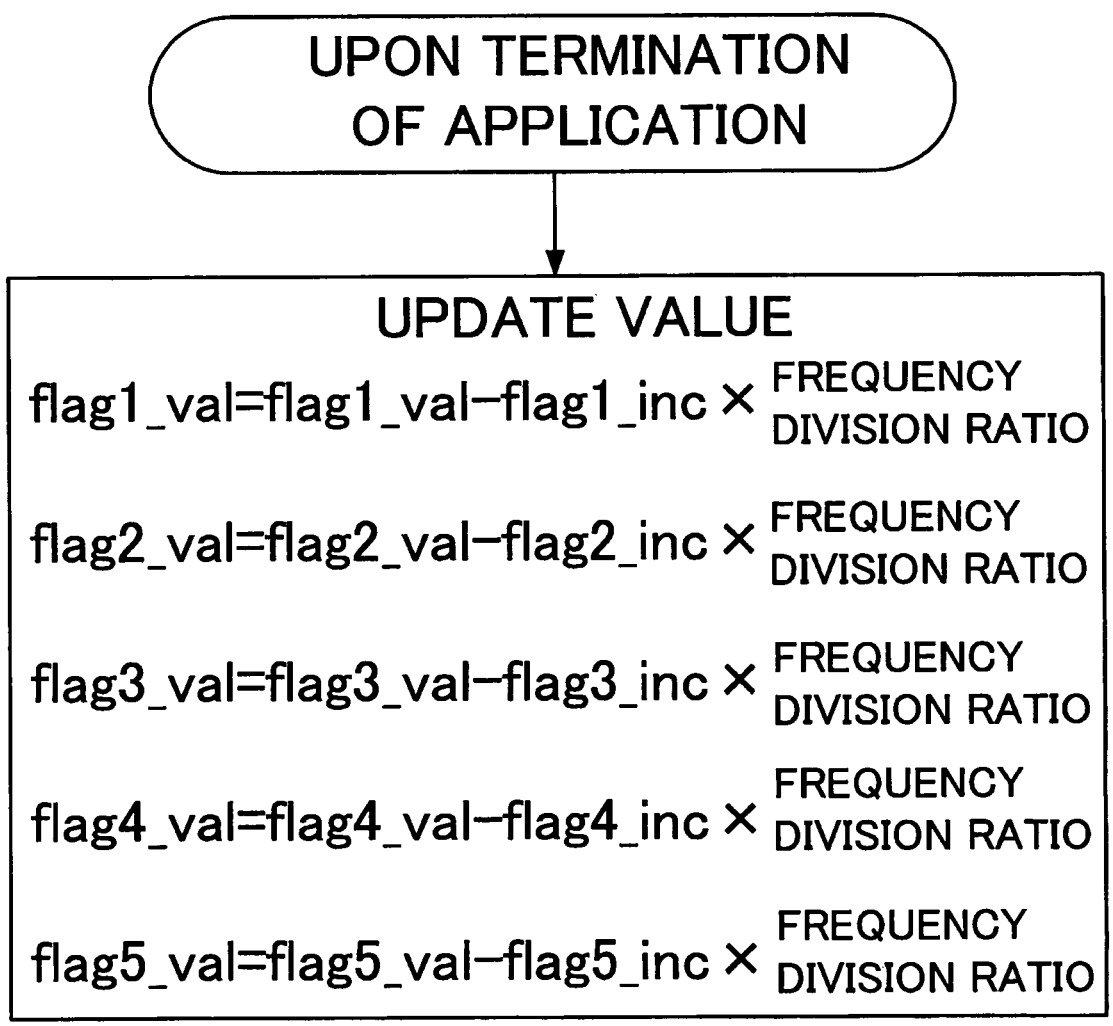
FIG. 13 is a diagram illustrating a computational process performed by the computing unit upon termination of an application.

FIG. 13 is a diagram illustrating a computational process performed by the computing unit 361 upon termination of an application.

Here, flag1_val will be described representatively.

When an application terminates, to newly calculate flag1_val, the value of flag1_inc in Table 5 is subtracted from the previous flag1_val after being multiplied by the frequency division ratio of the current main state depending on the application terminated this time (one of applications 1 to 4). The same applies to flag2_val, flag3_val, flag4_val, and flag5_val.

Figure 14:
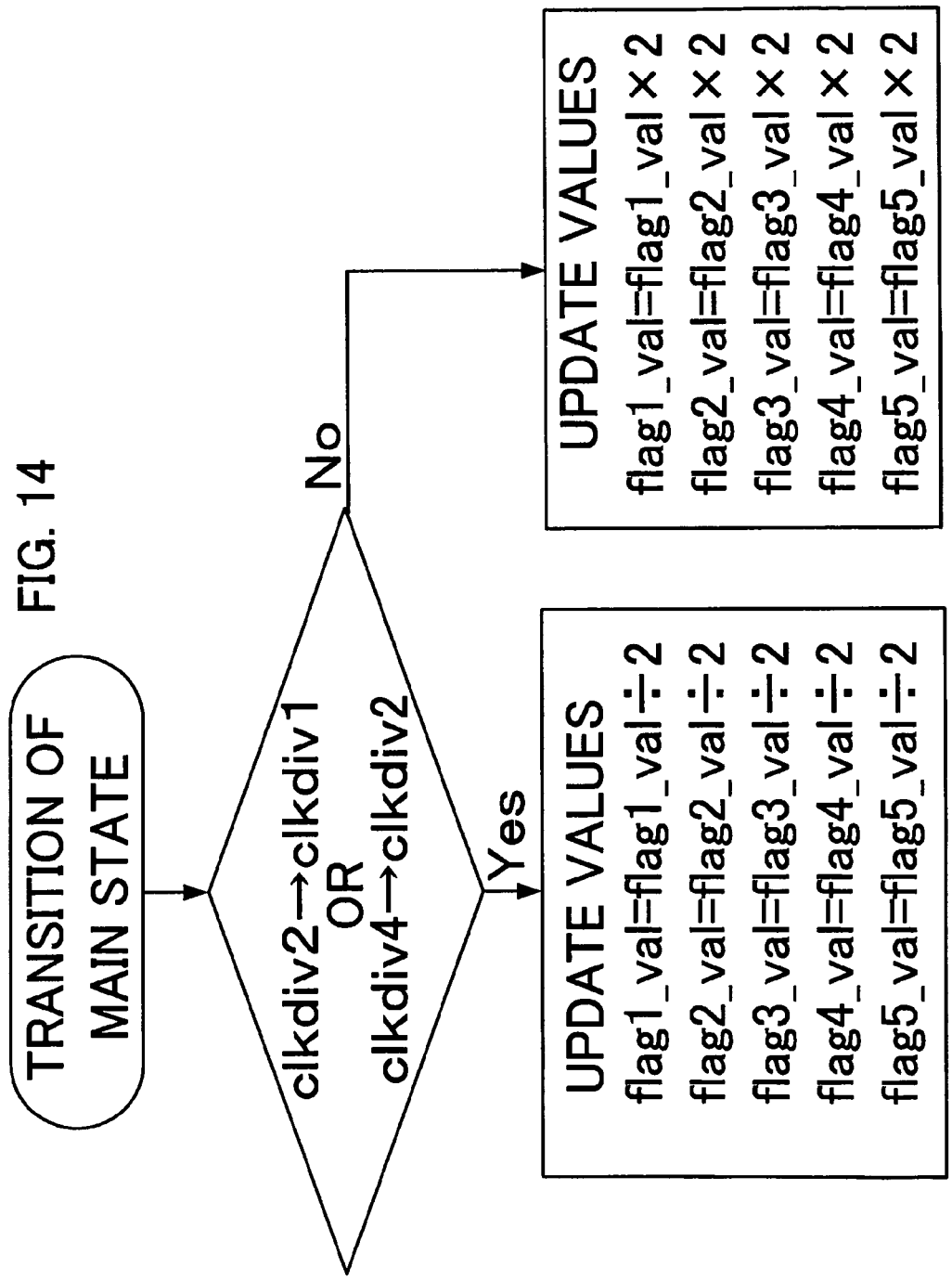
FIG. 14 is a diagram illustrating computations performed by the computing unit upon transition of a main state.

FIG. 14 is a diagram illustrating computations performed by the computing unit 361 upon transition of the main state.

It is determined here whether or not the transition is either from clkdiv2 to clkdiv1 or from clkdiv4 to clkdiv2, i.e., whether or not the transition is to a higher-frequency clock. When the transition is to a higher-frequency clock, the values of flag1_val to flag5_val are halved. When the transition is to a lower-frequency clock, the values of flag1_val to flag5_val are doubled. This is because when the frequency is doubled, the processing power is doubled as well and consequently the processing load for execution of the same process is halved whereas when the frequency is halved, the processing power is halved as well and consequently the processing load for execution of the same process is doubled.

The multiplication by the frequency division ratio in FIGS. 12 and 13 are carried out for the same reason.

At each event such as start-up of an application, termination of an application, or transition of the main state, flag1_val, flag2_val, flag3_val, flag4_val, and flag5_val stored, respectively, in the registers 336, 337, 338, 339, and 340 are inputted in sequence into the computing unit 361 in FIG. 9 via a multiplexer 323 switched by the state monitor 24. The computing unit 361 performs computations illustrated in FIGS. 12 to 15 according to the event and stores the computed values back in the original registers 336, 337, 338, 339, and 340 via another multiplexer 322 switched by the state monitor 24. Then, flag1_val to flag5_val stored in the registers 336, 337, 338, 339, and 340 are compared by respective comparators 341, 342, 343, 344, and 345 with respective thresholds flag1_lim to flag5_lim stored, respectively, in other registers 331, 332, 333, 334, and 335.

Table 6 is a correspondence table between substates and thresholds.

TABLE 6

|  | flag1_lim | flag2_lim | flag3_lim | flag4_lim | flag5_lim | Low |
|---|---|---|---|---|---|---|
| state1 | 0 | 0 | 0 | 0 | 0 | ↕ DSP load |
| state2 | 2 | 4 | 0 | 0 | 0 |  |
| state3 | 2 | 4 | 6 | 0 | 0 |  |
| state4 | 2 | 4 | 6 | 8 | 0 | High |

The correspondence table lists thresholds for processes A to E when four applications 1 to 4 (see Table 5) are viewed in a cross-sectional manner in the four substates (state1 to state4).

Specifically, regardless of the type of application, flag1_lim is the threshold for process A, flag2_lim is the threshold for process B, and flag3_lim to flag5_lim are the thresholds for processes C to E. For example, the threshold flag1_lim for process A in each substate (state1 to state4) is flag1_lim=0, 2, 2, 2. The same applies to flag2_lim to flag5_lim.

Thresholds sent via the MPU data path and a multiplexer 321 are set in the registers 331, 332, 333, 334, and 335 (FIG.

9) used to store the thresholds flag1_lim to flag5_lim. Paths on the output side of the multiplexer 321 are switched in sequence by the address decoder 140 and the thresholds are outputted sequentially from the MPU in synchronization with the switching and stored in the registers 331, 332, 333, 334, and 335 in sequence.

Figure 15:
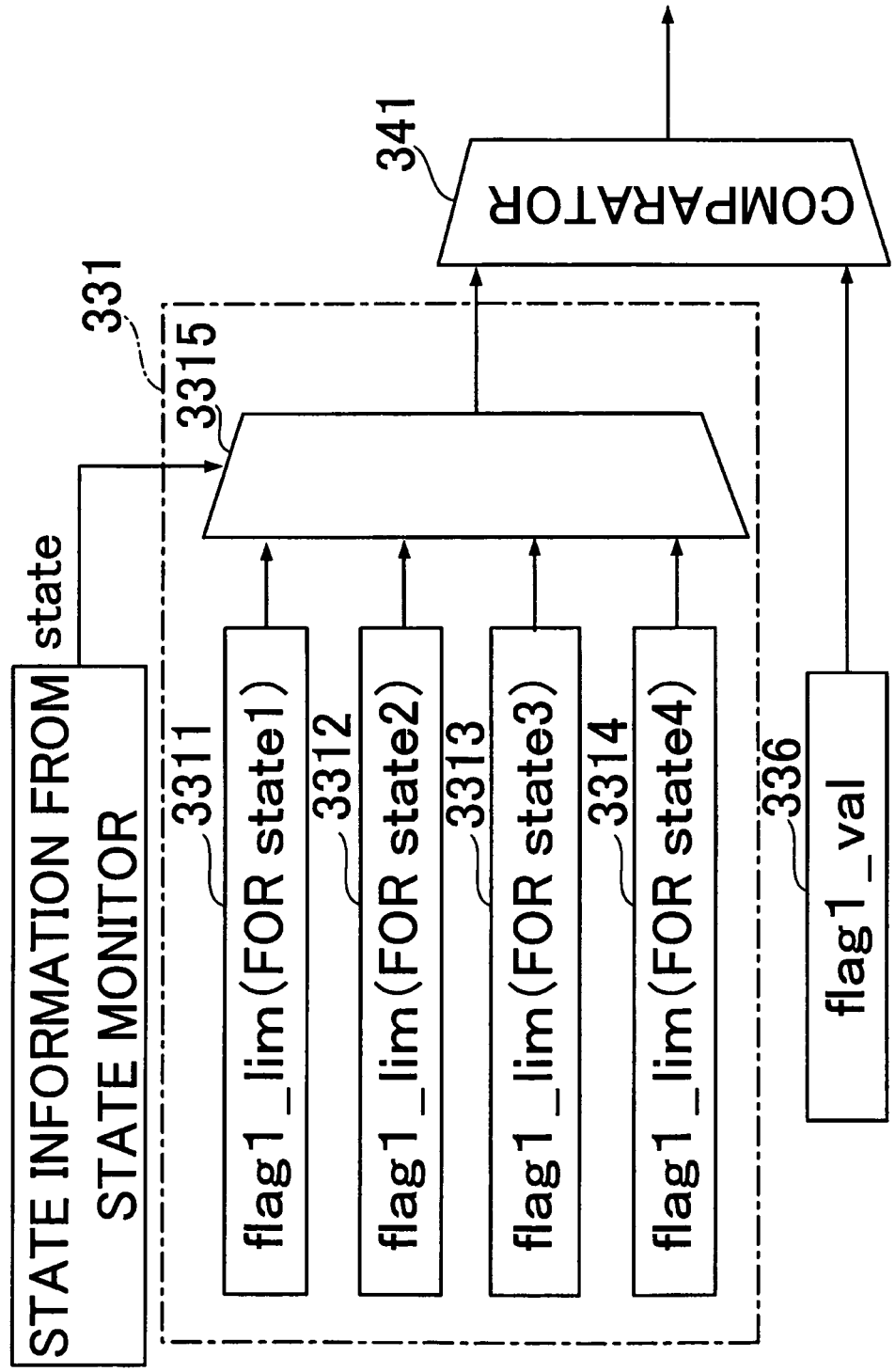
FIG. 15 is a detailed block diagram of a register for flag1_lim, illustrated in one block in FIG. 9.

FIG. 15 is a detailed block diagram of the register 331 for flag1_lim, where the register 331 is illustrated in one block in FIG. 9. The register 331 for flag1_lim will be described herein representatively, and the same applies to the registers 332 to 335 for flag2_lim to flag5_lim.

As listed in FIG. 15, the register 331 includes four separate registers 3311, 3312, 3313, and 3314 as well as a selector 3315 which selects one register from among the four registers 3311, 3312, 3313, and 3314.

As listed in Table 6, separate values of flag1_lim are defined for the four substates state1 to state4 and the four values are stored in the four registers 3311, 3312, 3313, and 3314, respectively. One of the four values is selected by the state monitor 24 illustrated in FIG. 9 based on the value of "state" which represents the current substate and inputted in the comparator 341. The comparator 341 compares the threshold flag1_lim thus selected and suited to the current substate with the variable flag1_val stored in the different register 336 to determine which is larger.

Table 7 lists comparison results produced by the five comparators 341, 342, 343, 344, and 345 illustrated in FIG. 9.

TABLE 7

| Comparator | MPU side | DSP side |
|---|---|---|
| flagn_val > flagn_lim(n = 1, . . . , 5) | 0 | 1 |
| flagn_val ≤ flagn_lim(n = 1, . . . , 5) | 1 | 0 |

In Table 7, "n" represents 1 to 5, and a case in which "n=1" will be described herein representatively.

When flag1_val>flag1_lim, i.e., when the variable flag1_val is larger than the threshold flag1_lim, a value '1' is outputted from the comparator 341 and inputted in a multiplexer 324 on the DSP side. At the same time, the value '1' is converted into a value '0' by an inverter 351 and the resulting value '0' is inputted in a multiplexer 325 on the MPU side.

On the other hand, when flag1_val≤flag1_lim, i.e., when the variable flag1_val is not larger than the threshold flag1_lim, a value '0' is outputted from the comparator 341 and inputted in the multiplexer 324 on the DSP side. At the same time, the value '0' is converted into a value '1' by the inverter 351 and the resulting value '1' is inputted in the multiplexer 325 on the MPU side.

Similarly, the other comparators 342, 343, 344, and 345 perform the same comparison operations and comparison results are inputted in the multiplexer 324 on the DSP side. At the same time, values inverted by inverters 352, 353, 354, and 355 are inputted in the multiplexer 325 on the MPU side.

The comparison results produced by the five comparators 341, 342, 343, 344, and 345 and inputted in the multiplexer 324 on the DSP side are outputted, respectively, as flag1, flag2, flag3, flag4, and flag5 on the DSP side at the instruction of the address decoder 139 upon start-up of five processes A to E illustrated in FIG. 8.

Similarly, the values produced by the inverters 351, 352, 353, 354, and 355 using the comparison results of the five comparators 341, 342, 343, 344, and 345 and inputted in the multiplexer 325 on the MPU side are outputted, respectively, as flag1, flag2, flag3, flag4, and flag5 on the MPU side at the instruction of the address decoder 140 upon start-up of five processes A to E illustrated in FIG. 8.

Now, processes performed by the DSP will be described with reference to FIG. 8. As an example, it is assumed here that flag1, flag2, flag3, flag4, and flag5 outputted from the multiplexer 324 on the DSP side are respectively as follows:

(flag1,flag2,flag3,flag4,flag5)=(0,1,0,1,1).

Since flag1=0, process A is not executed on the DSP; since flag2=1, process B is executed on the DSP; since flag3=0, process C is not executed on the DSP; since flag4=1, process D is executed on the DSP; and since flag5=1, process E is executed on the DSP.

Next, processes performed by the MPU will be described with reference to FIG. 8. When flag1, flag2, flag3, flag4, and flag5 outputted on the DSP side are (flag1, flag2, flag3, flag4, flag5)=(0, 1, 0, 1, 1) as described above, inverted values thereof are outputted on the MPU side as follows:

(flag1, flag2, flag3, flag4, flag5)=(1, 0, 1, 0, 0).

Since flag1 and flag3 are '1,' processes A and C are executed on the MPU. On the other hand, since flag2, flag4, and flag5 are '0,' processes B, D, and E are not executed on the MPU.

Results of processes A to E are stored in the memory 15 (see FIG. 1) which can be referenced both by the MPU and DSP to allow data exchange between the MPU and DSP. As described above, according to the second embodiment, loads are distributed between the DSP and MPU based on load prediction at each time point, with processes A to E being executed independently of one another.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
a clock generation section which generates and outputs a clock of a frequency according to a state;
an MPU and a DSP which, being supplied with the clock generated by the clock generation section, execute processes at a processing speed synchronized with the clock;
a load prediction section which predicts a DSP load based on a DSP application to be executed now out of DSP applications installed by being coded for processing by the DSP as well as on a frequency of a clock currently being outputted from the clock generation section;
a load allocation section which allocates a part of processes of the DSP application to be executed now to the MPU, based on the load predicted by the load prediction section and thereby makes the MPU execute the part of processes; and
an emulator which makes the MPU execute DSP applications, wherein the MPU executes a part of the DSP applications using the emulator, the part of the DSP applications being allocated by the load allocation section.

2. The electronic apparatus according to claim 1, wherein:

the electronic apparatus is a mobile telephone which has three states, namely, an idle state, a standby state, and an engaged state, the idle state including an activated state that occurs upon power-on and a suspended state that occurs upon power-down; and the clock generation section generates and outputs a clock of a relatively low frequency and a clock of a relatively high frequency in the standby state and the engaged state, respectively.

3. The electronic apparatus according to claim 1, wherein:

each of the DSP applications includes one or more processes;

a load table is provided, defining a load for each of the processes of the DSP application; and the load prediction section predicts the DSP load based on the load table and the frequency of the clock currently being outputted from the clock generation section.

4. The electronic apparatus according to claim 3, further comprising:

a substate management section which manages a current substate out of a plurality of substates into which a state in which the frequency of the clock outputted from the clock generation section remains constant is further divided according to loads; and a load threshold table which defines for each of the plurality of substates, a load threshold used to determine whether to allocate the processes of the DSP application to the MPU, wherein the load allocation section determines processes which are to be allocated to the MPU, based on the load predicted by the load prediction section, the current substate, and the load threshold table.

5. The electronic apparatus according to claim 4, wherein the load threshold table defines a load threshold for each unit of processes by treating a plurality of corresponding processes in a plurality of DSP applications as a unit when the plurality of DSP applications are viewed in a cross-sectional manner across the plurality of DSP applications.

6. A storage medium that stores a load distribution program which causes, when executed on an electronic apparatus, the electronic apparatus to operate as an electronic apparatus comprising:

a clock generation section which generates and outputs a clock of a frequency according to a state;

an MPU and a DSP which, being supplied with the clock generated by the clock generation section, execute processes at a processing speed synchronized with the clock;

a load prediction section which predicts a DSP load based on a DSP application to be executed now out of DSP applications installed by being coded for processing by the DSP as well as on a frequency of a clock currently being outputted from the clock generation section;

a load allocation section which allocates a part of processes of the DSP application to be executed now to the MPU, based on the load predicted by the load prediction section and thereby makes the MPU execute the part of processes; and an emulator which makes the MPU execute DSP applications, wherein the MPU executes a part of the DSP applications using the emulator, the part of the DSP applications being allocated by the load allocation section and converted by the emulator.

7. The storage medium according to claim 6, wherein:

each of the DSP applications includes one or more processes;

a load table is provided, defining a load for each of the processes of the DSP application; and the load prediction section predicts the DSP load based on the load table and the frequency of the clock currently being outputted from the clock generation section.

8. The storage medium according to claim 7, wherein the electronic apparatus further comprises:

a substate management section which manages a current substate out of a plurality of substates into which a state in which the frequency of the clock outputted from the clock generation section remains constant is further divided according to loads; and a load threshold table which defines for each of the plurality of substates, a load threshold used to determine whether to allocate the processes of the DSP application to the MPU, and the load allocation section determines processes which are to be allocated to the MPU, based on the load predicted by the load prediction section, the current substate, and the load threshold table.

* * * * *